United States Patent [19]
Noda

[11] Patent Number: 5,646,771
[45] Date of Patent: Jul. 8, 1997

[54] SETTING OPERATION POINT IN OPTICAL MODULATION APPARATUS

[75] Inventor: Arihide Noda, Tokyo, Japan

[73] Assignee: NEC Corporation, Japan

[21] Appl. No.: 617,331

[22] Filed: Mar. 18, 1996

[30] Foreign Application Priority Data

Mar. 17, 1995 [JP] Japan .................................. 7-058565

[51] Int. Cl.$^6$ .................................................. G02F 01/03
[52] U.S. Cl. .................................................. 359/245; 385/2
[58] Field of Search .................................. 359/187, 245, 359/276; 385/2

[56] References Cited

U.S. PATENT DOCUMENTS

| | | | |
|---|---|---|---|
| 5,359,449 | 10/1994 | Nishimoto et al. | 359/181 |
| 5,440,113 | 8/1995 | Morin et al. | 250/205 |
| 5,495,359 | 2/1996 | Gertel et al. | 359/245 |
| 5,521,749 | 5/1996 | Kawashima | 359/325 |

FOREIGN PATENT DOCUMENTS 5-323245  12/1993  Japan .

*Primary Examiner*—Mark Hellner
*Attorney, Agent, or Firm*—Ostrolenk, Faber, Gerb & Soffen, LLP

[57] ABSTRACT

A light outputted from a laser diode is intensity-modulated by an optical modulator in accordance with a modulation signal in which a sine wave signal outputted from a low frequency oscillator is superposed on a data signal by a drive amplifier. The output light from the optical modulator is branched by an optical coupler and converted into an electric signal by a light receiving element. A frequency component of the electric signal corresponding to the sine wave signal is extracted by a band pass filter. The extracted electric signal is amplified by a variable gain amplifier with a gain. A phase difference between the amplified electric signal and the sine wave signal is determined by a phase detector and a bias voltage controlled based on the phase difference is supplied from a DC amplifier to the optical modulator. The gain of the variable gain amplifier is changed such that the peak value of the extracted electric signal falls within an allowable voltage range of the phase detector. The operation point can be kept at a stable point even if displacement of the operation point is caused due to temperature change and degradation as time.

25 Claims, 4 Drawing Sheets

SETTING OPERATION POINT IN OPTICAL MODULATION APPARATUS

BACKGROUND OF THE INVENTION

1. Field of the Invention

The present invention relates to an optical modulation apparatus, and more particularly, to an optical modulation apparatus in which an operation point can be set at a stable point in intensity-modulating a light signal in accordance with an input electric signal.

2. Description of Related Art

As an optical modulator for intensity-modulating a light signal in accordance with an input data signal are modulators using effects such as photo-electric effect, photo-electro-magnetic effect and photoacoustic effect. In each of these modulators an operation point of an optical modulator is defined by applying a predetermined bias voltage to the optical modulator. Since the optical modulation apparatus changes in modulation characteristics due to peripheral temperature and degradation as time, the operation point is controlled by changing a bias voltage applied to the optical modulator. If the operation point shifts, an optimal dynamic range cannot be only obtained but the output light from the optical modulator is also distorted. In the optical modulation apparatus, the shift of the operation point is typically detected from the output light of the optical modulator to stabilize the operation point by changing the bias voltage in a direction in which the shift is cancelled.

FIG. 1 is a diagram showing the outlined structure of an optical modulation apparatus which is conventionally used. Light 22 outputted from a laser diode 21 is inputted to an optical modulator 23. A drive amplifier 24 is supplied with a data signal 25 and a sine wave signal 26 outputted from a low frequency oscillator 106. The drive amplifier 24 amplifies the data signal 25 and outputs a modulation signal 27 in which the sine wave signal 26 is superposed on the data signal 27. The optical modulator 23 modulates the intensity of light 22 emitted from the laser diode 21 in accordance with the modulation signal 27 from the drive amplifier 24. The output light of the optical modulator 23 is supplied to an optical coupler 28. The optical coupler 28 branches the inputted light into two with a predetermined branch ratio. One light component branched by the optical coupler 28 is externally taken out as the output light of the optical modulation apparatus, whereas, the other light component is supplied an light receiving element 29. The light receiving element 29 is typically a PIN diode and outputs an electric signal in accordance with the light intensity. The electric signal is supplied from the light receiving element 29 to a band pass filter 12. The band pass filter 12 extracts a frequency component of the electric signal having the same frequency as the output signal 26 from the low frequency oscillator 15. The output of band pass filter 12 is supplied to a phase detector 14. Also, the phase detector 14 is supplied with the sine wave signal 26 outputted from the low frequency oscillator 15. The phase detector 14 compares these signals in phase and outputs a bias voltage control signal 31 in accordance with the phase difference. The bias voltage control signal 31 is supplied to a DC amplifier 32. The DC amplifier 32 changes based on the bias voltage control signal 31 a voltage value of a bias voltage signal 33 which is supplied to the optical modulator 23.

FIG. 3 is a diagram showing the modulation characteristic of the optical modulator. The abscissa represents an input voltage to the optical modulator and the ordinate represents light intensity outputted from the optical modulator when light having a predetermined intensity is inputted. The optical modulator 23 shown in FIG. 1 has the modulation characteristic in which a sine wave is repeated, as shown in the figure by a solid line 41. The modulation characteristic is shifted due to the temperate change and degradation as time, as shown in the figure by a dashed line 42. The point on which a dynamic range is widest is preferable as the operation point of the optical modulator 23. Such a point is referred to as a stable point hereinafter. The black circles 43 to 45 shown in the figure represent the stable points in the modulation characteristic shown by the solid line 41. For instance, a stable point corresponding to the stable point 43 is the black circle 46 on the modulation characteristic curve shifted as shown by the dashed line 42. When the operation point is just coincident with one of the these stable points, two signal inputted to the phase detector 14 are equal to each other in phase. That is, the sine wave signal outputted from the low frequency oscillator 15 is equal to the electric signal from the band pass filter 12 in phase. If the operation point is displaced from the stable point, the phase difference is caused in accordance with the displacement. The direction of the phase difference also changes in accordance with the direction in which the operation point is displaced from the stable point. The optical modulation apparatus detects the phase difference by the phase detector 14 and holds the operation point at the stable point by controlling the bias voltage such that there is no phase difference.

An optical modulation apparatus is disclosed in Japanese Laid Open Patent Disclosure (JP-A-Tokukaihei 5-323245) in which light intensity is modulated in accordance with a modulation signal in which a sine wave signal having a frequency sufficiently lower than an information signal is superposed on the information signal and an operation point is stabilized based on the light intensity after the modulation. In this optical modulation apparatus, an electric signal obtained by photoelectric converting the output light from the optical modulator is sample-held at the phase in which the amplitude of the superposed sine wave signal is maximum. The held voltage value is compared with a reference voltage and the magnitude and direction of change of the bias voltage are determined in accordance with the comparing result.

In the optical modulation apparatus shown in FIG. 1, the phase detector 14 typically has an allowable input voltage range. If a voltage inputted to the phase detector 14 does not fall within the allowable input voltage range, and the extracted signal is not a correct sine wave, the phase detection cannot De correctly executed. On the other hand, the magnitude and waveform of the voltage signal inputted to the phase detector 14 vary due to various factors such as change of an output level of the laser diode 21, change of passing loss in the optical modulator 23 due to degradation as time, and change of branch ratio in the optical coupler 28 due to change of peripheral temperature. For this reason, there is a problem in that the operation point goes out of the stable point so that a distortion is caused in the waveform of output light from the optical modulator. Further, if the magnitude of the signal voltage inputted to the phase detector 14 is smaller or larger than the minimum or maximum of the allowable input voltage range, the detecting precision of the phase difference becomes wrong because the ratio of signal to noise in the input signal is degraded. For this reason, there is a problem in that the operation point goes out of the stable point so that distortion is caused in the output light of the optical modulator.

In the optical modulation apparatus disclosed in JP-A-Tokukaihei 5-323245, the voltage signal is sample-held at a predetermined timing and compared with the reference voltage to detect the shift of the operation point from the stable point. Therefore, in this apparatus, if the reference voltage varies, the shift of the operation point cannot be correctly detected. For this reason, there is a problem in that stabilization of the operation point against temperature change is difficult, compared to the case that the shift of the operation point is detected through phase comparison as in the optical modulating apparatus shown in FIG. 1.

SUMMARY OF THE INVENTION

Therefore, an object of the present invention is to provide a method of stabilizing an operation point, in which method an operation point is held at a stable point even if there is temperature change and degradation as time, and an optical modulation apparatus for the method.

In order to achieve an aspect of the present invention, an optical modulation apparatus includes an optical modulator for optically modulating a light with an operation point set by a bias voltage in accordance with an electric modulation signal to produce an optical signal, the electric modulation signal being obtained by superposing a data signal on an electric carrier signal, an operation point detector for detecting the operation point of the optical modulator based on the electric carrier signal and an amplified electric signal, a bias voltage supply section for supplying to the optical modulator the bias voltage determined based on the detected operation point, an electric signal extracting section for extracting an electric signal corresponding to the electric carrier signal from the optical signal outputted from the optical modulator, a variable gain amplifier for amplifying the extracted electric signal with a gain such that the amplified electric signal is adaptive for the operation point detector, and for supplying the amplified electric signal to the operation point detector.

The amplifier amplifies the extracted electric signal while changing the gain such that the amplified electric signal has always a constant level. In this case, the amplifier includes a peak detector for detecting a peak value of the extracted electric signal, and a comparator for comparing the detected peak value with a preset voltage value to determine the gain. Alternatively, the amplifier may amplify the extracted electric signal while changing the gain such that the amplified electric signal has the same level as the electric carrier signal. In this case, the amplifier includes a first peak detector for detecting a peak value of the extracted electric signal, a second peak detector for detecting a peak value of the electric carrier signal or sine wave signal, and a comparator for comparing the detected peak value with a peak value of the electric carrier signal to determine the gain.

In order to achieve another aspect of the present invention, a method of stabilizing an operation point of an optical modulator, includes the steps of:

optically modulating a light with an operation point set by a bias voltage in accordance with an electric modulation signal by an optical modulator to produce an optical signal, the electric modulation signal being obtained by superposing a data signal on an electric carrier signal;

extracting an electric signal corresponding to the electric carrier signal from the optical signal outputted from the optical modulator;

amplifying the extracted electric signal with a gain such that the amplified electric signal has a level smaller than a predetermined level;

detecting the operation point of the optical modulator based on the electric carrier signal and the amplified electric signal; and supplying to the optical modulator the bias voltage determined based on the detected operation point to control the operation point.

In order to achieve still another aspect of the present invention, an optical modulation apparatus includes a generating section for generating a sine wave signal having a predetermined frequency lower than a frequency of an information signal indicative of information, a superposing section for superposing the sine wave signal outputted from the generating section on the information signal, an optical modulator for optically modulating a light with an operation point set by a bias voltage based on a signal outputted from the superposing section to produce an optical signal, an extracting section for extracting a frequency component corresponding to the sine wave signal from the optical signal, an amplifier for amplifying the electric signal having the frequency component while changing a gain such that the amplified electric signal has a level lower than a predetermined level, a phase detector for comparing the electric signal amplified by the amplifier with the sine wave signal outputted from the generating section in phase to detect a deviation of the operation point in the optical modulation means from a preset point, and a bias voltage supply section for supplying to the optical modulator the bias voltage determined changed based on the detecting result of the phase detecting means to stabilize the operation point.

DESCRIPTION OF THE PREFERRED EMBODIMENTS

The embodiments of the present invention will be described below.

Figure 1:
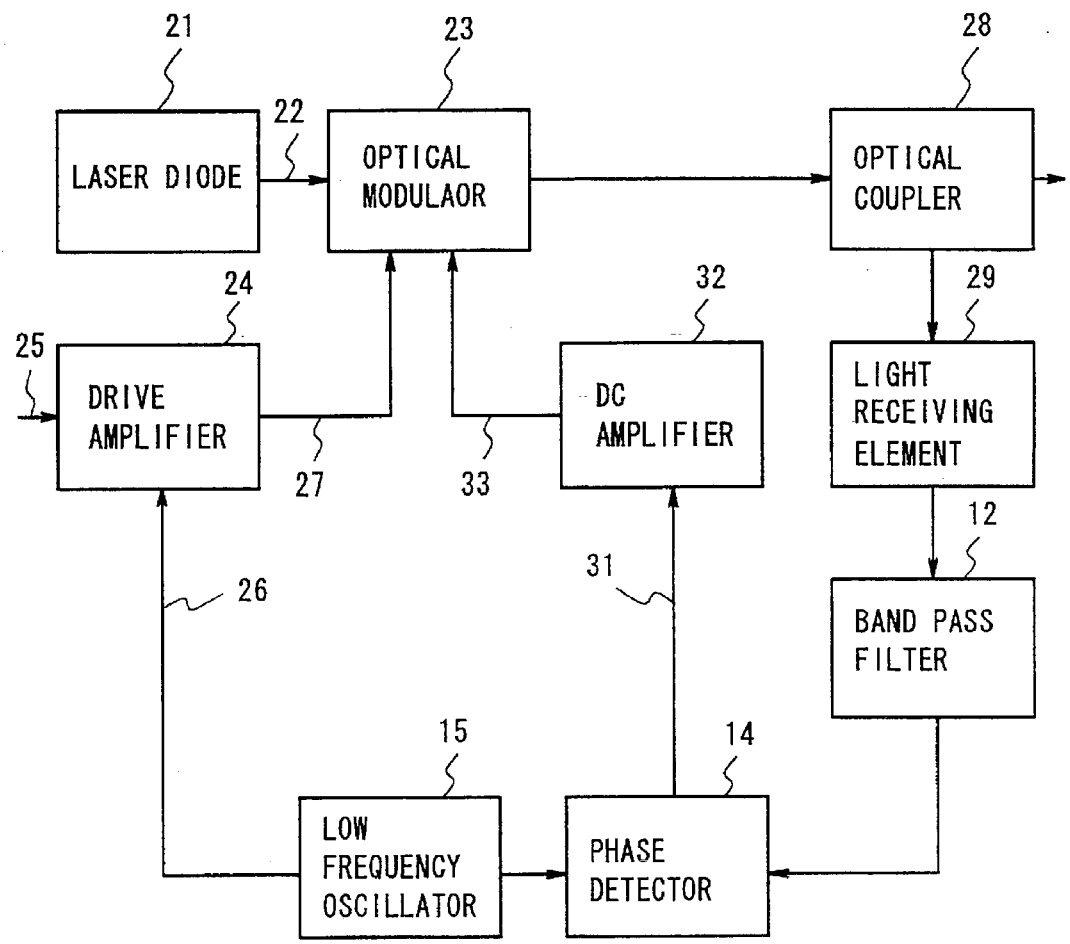
FIG. 1 is a block diagram showing the outlined structure of a conventional optical modulation apparatus.
Figure 3:
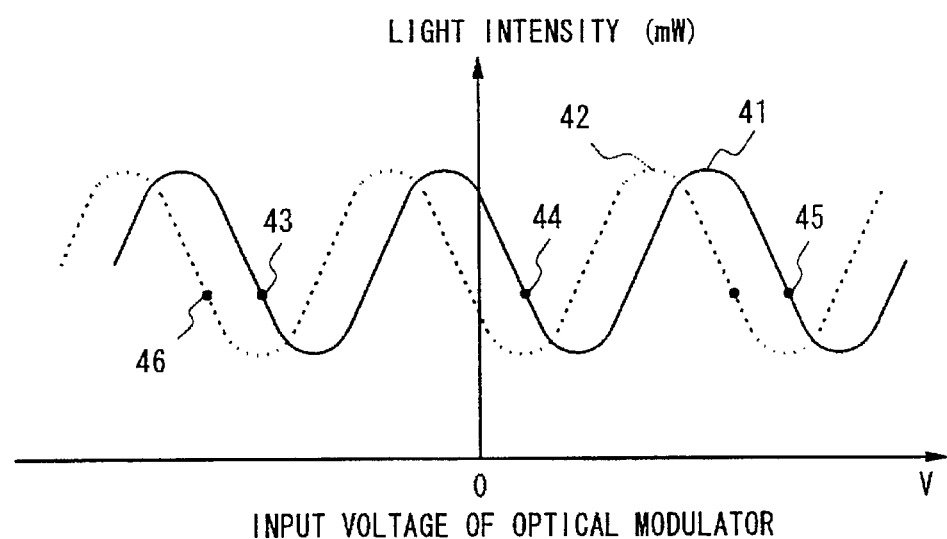
FIG. 3 is a characteristic diagram representative of the modulation characteristic of an optical modulator.
Figure 2:
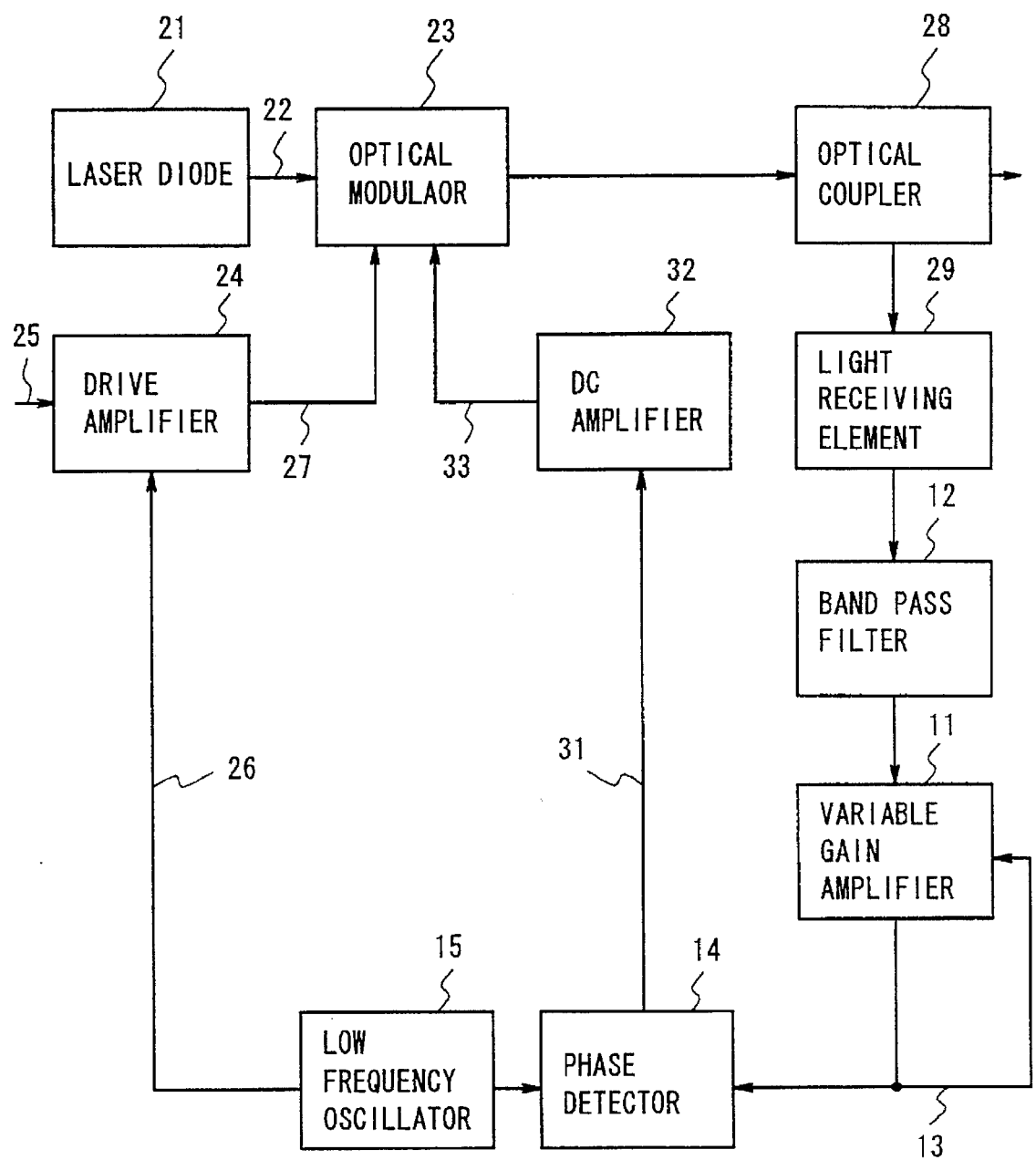
FIG. 2 is a block diagram showing the outlined structure of an optical modulation apparatus according to a first embodiment of the present invention.
Figure 4:
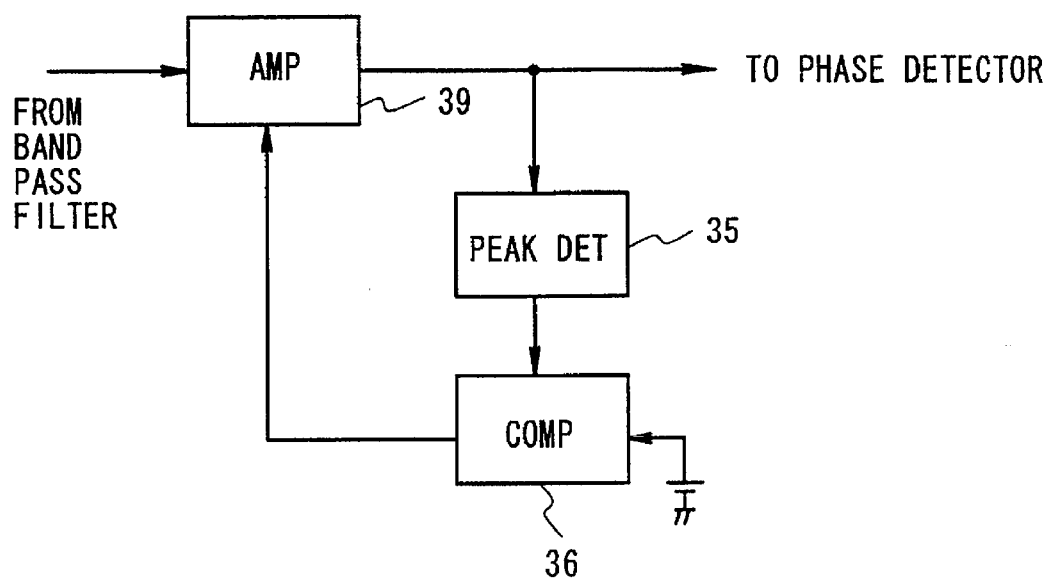
FIG. 4 is a block diagram illustrating an example of variable gain amplifier of the optical modulation apparatus shown in FIG. 2.

FIG. 2 is a diagram showing the outlined structure of an optical modulation apparatus according to the first embodiment of the present invention. Light 22 outputted from a laser diode 21 is inputted to an optical modulator 23. A drive amplifier 24 receives a data signal 25 indicative of a data to be transmitted and a sine wave signal 26 as a carrier signal having a frequency lower than the data signal 25 from a low frequency oscillator 15 and superposes the sine wave signal 26 on the data signal 25 to produce a modulation signal 27 which is supplied to the optical modulator 23. The optical modulator 23 receives a bias voltage 33 from DC amplifier 32 to determine an operation point and modulates the intensity of light 22 inputted from the laser diode 21 in accordance with the modulation signal 27 from the drive amplifier 24 with respect to the operation point. A Mach-Zehnder interferometer type optical modulator made of lithium niobate (LiNbO$_3$) is used as the optical modulator 23. The output light of the optical modulator 23 is supplied to an optical coupler 28. The optical coupler 28 is an optical element for branching the inputted light into two with a predetermined branch ratio. One light component branched by the optical coupler 28 is externally taken out as the output light of the optical modulation apparatus. The other light component branched by the optical coupler 28 is supplied an light receiving element 29. The light receiving element 29 is a circuit element for outputting an electric signal in accordance with the light intensity and is formed of a PIN photo-diode in the example, i.e., photoelectrically converting the light component from the optical coupler 28 into the electric signal. The electric signal is supplied from the light receiving element 29 to a band pass filter 12. The band pass filter 12 is a filter for extracting from the electric signal a signal having the same frequency as the sine wave signal 26 outputted from the low frequency oscillator 15. The center passing frequency of the band pass filter 12 is set to 1 kHz. The output of band pass filter 12 is supplied to the variable gain amplifier 11.

The variable gain amplifier 11 is composed of amplifier 39 for amplifying the signal passed through the band pass filter 12 with a gain, a peak detector 35 for detecting the peak value of the amplified signal, a comparator 36 for comparing the detected peak value with a predetermined reference voltage to determine the gain of the amplifier 39 such that the detected peak value is equal to the reference voltage. The reference voltage is determined in advance such that the peak value of the amplified signal falls within an allowable input voltage range of a phase detector 14 to be described later. In this embodiment, the reference voltage is set to 80 percent of the maximum of allowable input voltage range. The amplified signal is supplied to the phase detector 14. The phase detector 14 is also supplied with the sine wave signal 26 from the low frequency oscillator 15. The phase detector 14 compares these signals in phase to determine a phase difference between these signals and determine a bias voltage control signal 31 in accordance with the phase difference to output to a DC amplifier 32. The DC amplifier 32 changes the bias voltage to be supplied to the optical modulator 23, based on the bias voltage control signal 31 such that the operation point of the optical modulator 23 is always located on a stable point. The bias voltage 33 is supplied to the optical modulator 23.

In operation, if the electric signal outputted from the light receiving element 29 as a photoelectric converter changes due to the change of peripheral temperature and degradation as time in an optical element so that the peak value detected by the peak detector 35 of the variable gain controller 11 becomes smaller than the reference voltage, the gain of the amplifier 11 is increased such that the peak value is equal to the reference voltage. If the peak value is greater than the reference voltage, the gain of the amplifier 11 is decreased. In this manner, the peak value of the signal supplied to the phase detector 14 is kept to the predetermined reference voltage, i.e., a level lower than the maximum of allowable input voltage range.

By controlling the gain, the maximum amplitude of the signal outputted from the variable gain amplifier 11 becomes constant. However, because the phase detector 14 compares not the signal levels but the phases of signals, a phase difference can be detected even if the maximum amplitude of the signal supplied from the variable gain amplifier 11 is constant. Further, because the phases are compared, the detection precision is not influenced even if the voltage value of the reference voltage used in the variable gain amplifier 11 changes somewhat.

Since the temperature change and degradation as time as the factor due to which the electric signal outputted by the light receiving element 29 changes are gently caused, the gain of the variable gain amplifier is unnecessary to rapidly change. Thus, by controlling the gain of the variable gain amplifier 11, the proper signal whose level does not exceed the allowable input voltage range can be supplied to the phase detector 14 so that the phase comparison can be executed properly, resulting in stabilization of the operation point.

Further, since the amplifier 11 gain is controlled such that the peak value is equal to the reference voltage, the signal having a proper level can be supplied to the phase detector 14 even if the level of light signal is low. Thereby, there is no case that the detection precision of phase difference by the phase detector 14 is degraded for too low signal level.

Figure 6:
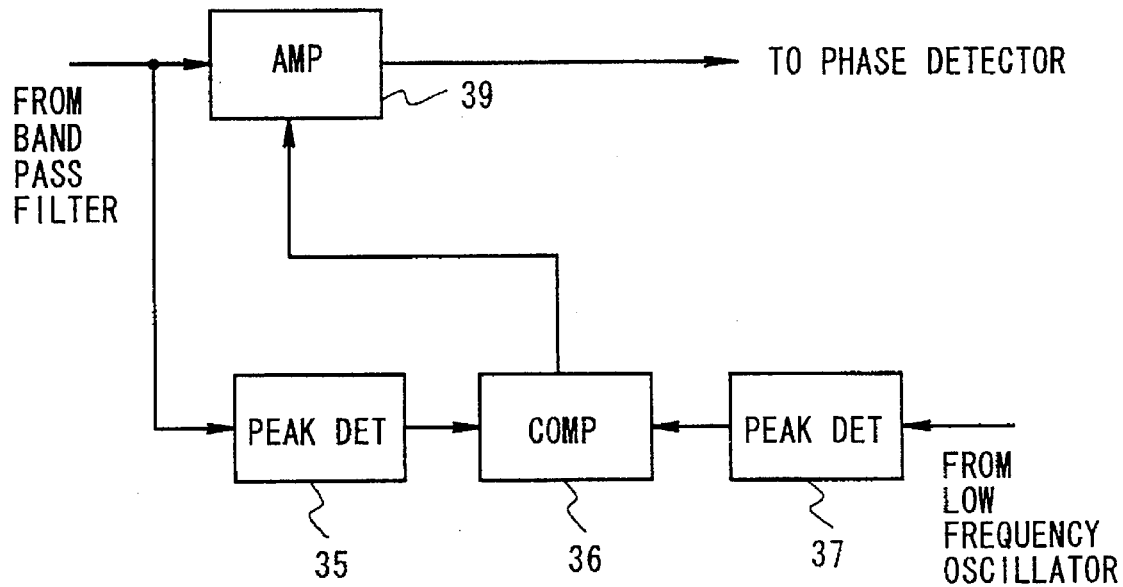
FIG. 6 is a block diagram illustrating an example of variable gain amplifier of the optical modulation apparatus shown in FIG. 5.
Figure 5:
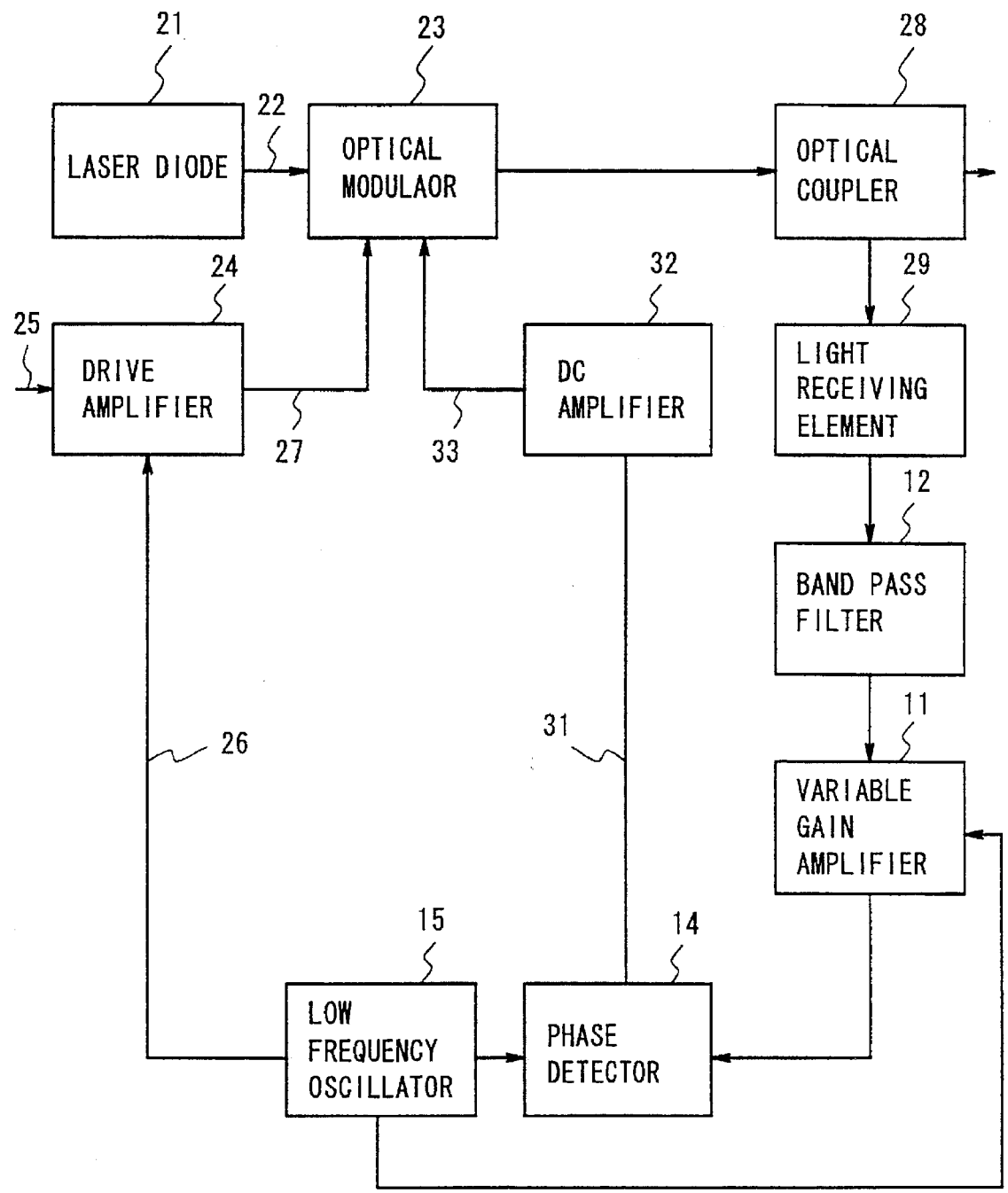
FIG. 5 is a block diagram showing the outlined structure of an optical modulation apparatus according to a second embodiment of the present invention.

Next, the optical modulation apparatus according to the second embodiment of the present invention will be described below with reference to the FIGS. 5 and 6. In FIG. 5, the major part of the optical modulation apparatus is the same as that shown in FIG. 2. In FIG. 5, the variable gain amplifier 11 is different from that shown in FIG. 2. The variable gain controller 11 in the second embodiment is composed of the amplifier 39, the first peak detector 35, and the comparator 36. The variable gain controller 11 further includes a second peak detector 37 for detecting a peak value of the sine wave signal 26 supplied from the low frequency oscillator 15. The comparator 36 compares the peak value of the electric signal passed through the band pass filter 12 with the peak value of the sine wave signal 26 to determine the gain of the amplifier 39 such that the amplified signal by the amplifier 39 has the peak level equal to the peak level of the sine wave signal 26. As a result, the phase detection can be performed with higher precision. In the second embodiment, the peak detector 35 inputs the signal passed through the filter 12. However, the peak detector 35 may receive the amplified signal by the amplifier 39.

What is claimed:

1. An optical modulation apparatus comprising:

optical modulation means for optically modulating a light with an operation point set by a bias voltage in accordance with an electric modulation signal to produce an optical signal, the electric modulation signal being obtained by superposing a data signal on an electric carrier signal;

operation point detecting means for comparing the electric carrier signal and an amplified electric signal to detect a phase difference between the electric carrier signal and an amplified electric signal;

bias voltage supply means for supplying to said optical modulation means the bias voltage determined based on the detected phase difference;

electric signal extracting means for extracting an electric signal corresponding to the electric carrier signal from the optical signal outputted from said optical modulation means; and amplifying means for amplifying the extracted electric signal with a gain such that the amplified signal has an amplitude corresponding to that of the electric carrier signal and for supplying the amplified electric signal to said operation point detecting means.

2. An optical modulation apparatus according to claim 1, wherein said amplifying means amplifies the extracted electric signal while changing the gain such that the amplified electric signal always has a constant level.

3. An optical modulation apparatus according to claim 2, wherein said amplifying means includes:

peak detecting means for detecting a peak value of the extracted electric signal; and comparing means for comparing the detected peak value with a preset voltage value to determine the gain.

4. An optical modulation apparatus according to claim 1, wherein said amplifying means amplifies the extracted electric signal while changing the gain such that the amplified electric signal has the same level as the electric carrier signal.

5. An optical modulation apparatus according to claim 4, wherein said amplifying means includes:

peak detecting means for detecting a peak value of the extracted electric signal; and comparing means for comparing the detected peak value with a peak value of the electric carrier signal to determine the gain.

6. A method of stabilizing an operation point of an optical modulator, comprising the steps of:

optically modulating a light with an operation point set by a bias voltage in accordance with an electric modulation signal by an optical modulator to produce an optical signal, the electric modulation signal being obtained by superposing a data signal on an electric carrier signal;

extracting an electric signal corresponding to the electric carrier signal from the optical signal outputted from said optical modulator;

amplifying the extracted electric signal with a gain such that the amplified electric signal has an amplitude corresponding to that of the electric carrier signal;

detecting the operation point of the optical modulator based on the electric carrier signal and the amplified electric signal; and supplying to said optical modulator the bias voltage determined based on the detected operation point and a predetermined operation point to control the operation point.

7. A method according to claim 6, wherein said amplifying step includes amplifying the extracted electric signal while changing the gain such that the amplified electric signal has always a constant level.

8. A method according to claim 7, wherein said amplifying step includes:

detecting a peak value of the extracted electric signal; and comparing the detected peak value with a preset voltage value to determine the gain.

9. A method according to claim 6, wherein said amplifying step includes amplifying the extracted electric signal while changing the gain such that the amplified electric signal has the same level as the electric carrier signal.

10. A method according to claim 9, wherein said amplifying step includes:

detecting a peak value of the extracted electric signal; and comparing the detected peak value with a peak value of the electric carrier signal to determine the gain.

11. An optical modulation apparatus comprising:

generating means for generating a sine wave signal having a predetermined frequency lower than a frequency of an information signal indicative of information;

superposing means for superposing the sine wave signal outputted from said generating means on the information signal;

optical modulation means for optically modulating a light with an operation point set by a bias voltage based on a signal outputted from said superposing means to produce an optical signal;

extracting means for extracting a frequency component corresponding to the sine wave signal from the optical signal;

amplifying means for amplifying the electric signal having the frequency component while changing a gain such that the amplified electric signal has an amplitude corresponding to that of the electric carrier signal;

phase detecting means for comparing the electric signal amplified by said amplifying means with the sine wave signal outputted from said generating means in phase to detect a deviation of the operation point in said optical modulation means from a preset point; and bias voltage supply means for supplying to said optical modulation means the bias voltage determined, based on the deviation of the operation point detected by said phase detecting means to stabilize the operation point.

12. An optical modulation apparatus according to claim 11, wherein said amplifying means amplifies the extracted electric signal while changing the gain such that the amplified electric signal always has a constant level.

13. An optical modulation apparatus according to claim 12, wherein said amplifying means includes:

peak detecting means for detecting a peak value of the extracted electric signal; and comparing means for comparing the detected peak value with a preset voltage value to determine the gain.

14. An optical modulation apparatus according to claim 11, wherein said amplifying means amplifies the extracted electric signal while changing the gain such that the amplified electric signal has the same level as the electric carrier signal.

15. An optical modulation apparatus according to claim 14, wherein said amplifying means includes:

peak detecting means for detecting a peak value of the extracted electric signal; and comparing means for comparing the detected peak value with a peak value of the electric carrier signal to determine the gain.

16. An optical modulation apparatus comprising:

an optical modulator to optically modulate a light with an operation point set by a bias voltage in accordance with an electric modulation signal to produce an optical signal, the electric modulation signal being obtained by superposing a data signal on an electric carrier signal;

an operation point detector to compare the electric carrier signal and an amplified electric signal to detect a phase difference between the electric carrier signal and an amplified electric signal;

a bias voltage supply to supply to said optical modulator the bias voltage determined based on the detected phase difference;

an electric signal extracting device to extract an electric signal corresponding to the electric carrier signal from the optical signal outputted from said optical modulator; and an amplifier to amplify the extracted electric signal with a gain such that the amplified signal has an amplitude corresponding to that of the electric carrier signal, and to supply the amplified electric signal to said operation point detector.

17. An optical modulation apparatus according to claim 16, wherein said amplifier amplifies the extracted electric signal while changing the gain such that the amplified electric signal always has a constant level.

18. An optical modulation apparatus according to claim 17, wherein said amplifier includes:
- a peak detecting device to detect a peak value of the extracted electric signal; and
- a comparing device to compare the detected peak value with a preset voltage value to determine the gain.

19. An optical modulation apparatus according to claim 16, wherein said amplifier amplifies the extracted electric signal while changing the gain such that the amplified electric signal has the same level as the electric carrier signal.

20. An optical modulation apparatus according to claim 19, wherein said amplifier includes:
- a peak detecting device to detect a peak value of the extracted electric signal; and
- a comparing device to compare the detected peak value with a peak value of the electric carrier signal to determine the gain.

21. An optical modulation apparatus comprising:
- a generator to generate a sine wave signal having a predetermined frequency lower than a frequency of an information signal indicative of information;
- a superposing device to superpose the sine wave signal outputted from said generator on the information signal;
- an optical modulator to optically modulate a light with an operation point set by a bias voltage based on a signal outputted from said superposing device to produce an optical signal;
- an extracting device to extract a frequency component corresponding to the sine wave signal from the optical signal;
- an amplifier to amplify the electric signal having the frequency component while changing a gain such that the amplified electric signal has an amplitude corresponding to that of the electric carrier signal;
- a phase detector to compare the electric signal amplified by said amplifier with the sine wave signal outputted from said generator in phase to detect a deviation of the operation point in said optical modulator from a preset point; and
- a bias voltage supply to supply to said optical modulator the bias voltage determined, based on the deviation of the operation point detected by said phase detector to stabilize the operation point.

22. An optical modulation apparatus according to claim 21, wherein said amplifier amplifies the extracted electric signal while changing the gain such that the amplified electric signal always has a constant level.

23. An optical modulation apparatus according to claim 22, wherein said amplifier includes:
- a peak detecting device to detect a peak value of the extracted electric signal; and
- a comparing device to compare the detected peak value with a preset voltage value to determine the gain.

24. An optical modulation apparatus according to claim 21, wherein said amplifier amplifies the extracted electric signal while changing the gain such that the amplified electric signal has the same level as the electric carrier signal.

25. An optical modulation apparatus according to claim 24, wherein said amplifier includes:
- a peak detecting device to detect a peak value of the extracted electric signal; and
- a comparing device to compare the detected peak value with a peak value of the electric carrier signal to determine the gain.

* * * * *